May 17, 1960 G. C. HOLMES 2,936,971
HELICOPTER
Filed Jan. 13, 1956 3 Sheets-Sheet 1

GENE C. HOLMES
INVENTOR.

BY Lyon & Lyon
ATTORNEYS

GENE C. HOLMES
INVENTOR.

BY Lyon & Lyon
ATTORNEYS

May 17, 1960 G. C. HOLMES 2,936,971
HELICOPTER
Filed Jan. 13, 1956 3 Sheets-Sheet 3
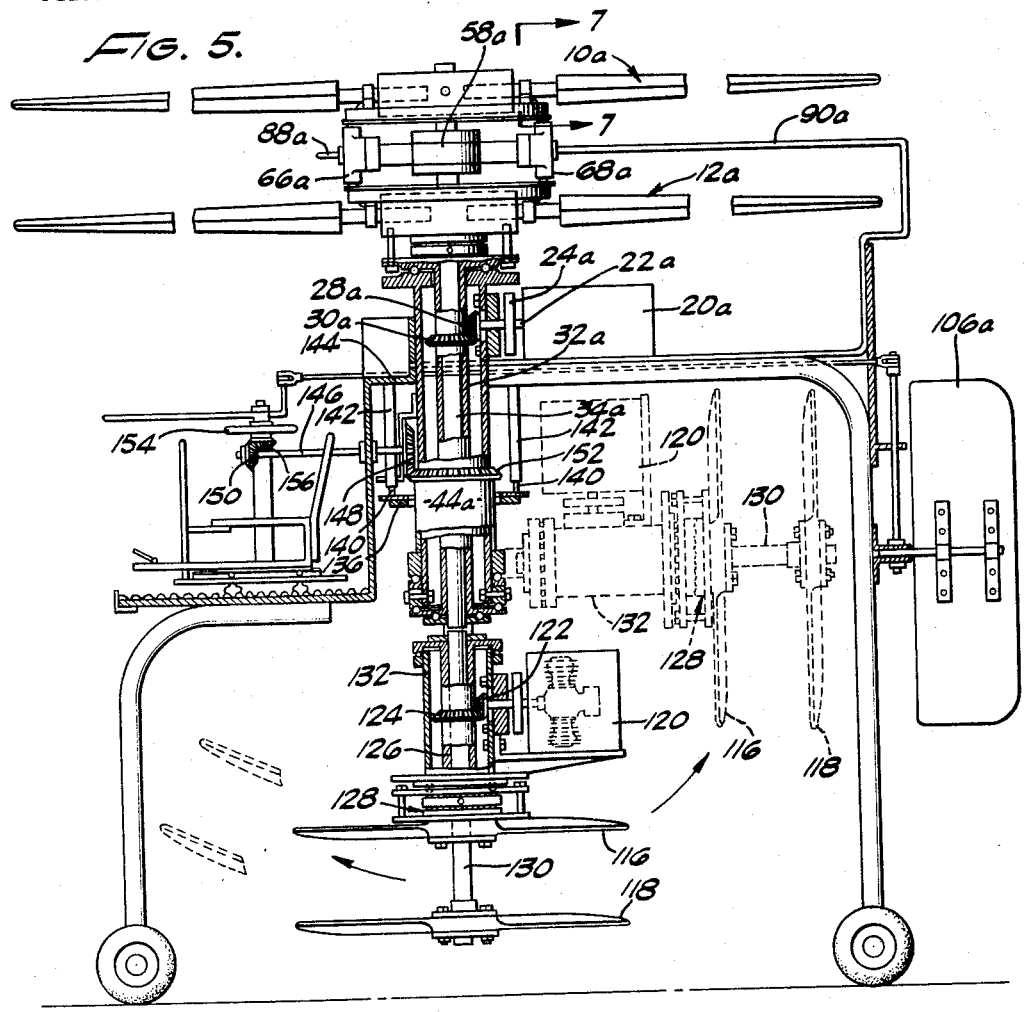
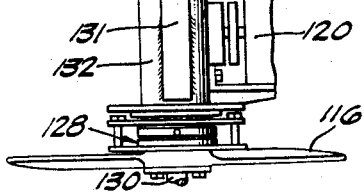
GENE C. HOLMES
INVENTOR.
BY Lyon & Lyon
ATTORNEYS

United States Patent Office 2,936,971
Patented May 17, 1960

2,936,971

HELICOPTER

Gene C. Holmes, Los Angeles, Calif.

Application January 13, 1956, Serial No. 559,008

4 Claims. (Cl. 244—17.21)

This invention relates to an improvement in aircraft capable of vertical ascent and descent.

It is an object of this invention to provide improved means for controlling vertical movement of the aircraft.

It is a further object of this invention to provide greatly simplified means for controlling vertical movement of such an aircraft thereby reducing the cost, weight, over-all size and vibration.

It is still a further object of this invention to substantially reduce the size of the rotors utilized to control vertical movement of this type of aircraft.

It is still a further object of this invention to provide lifting means above and below the fuselage of the aircraft during vertical ascent and descent to materially increase the vertical lift obtainable.

It is still a further object of this invention to provide a novel means for controlling the direction of movement of the craft while in flight.

It is still a further object of this invention to provide means for stabilizing and controlling the direction of movement of the aircraft while in flight.

It is still a further object of this invention to provide means to balance weight of the aircraft and maintain said balance without the use of ballast.

It is still a further object of this invention to provide driving means increasing the speed of such aircraft.

Other objects and advantages will be readily apparent from the following description:

In the drawings:

Figure 5 is a view similar to Figure 1 of a modified form of this invention.

Figure 6 is an enlarged view of the propeller mounting.

Figure 7 is a view taken along line 7—7 of Figure 5.

Figure 1:
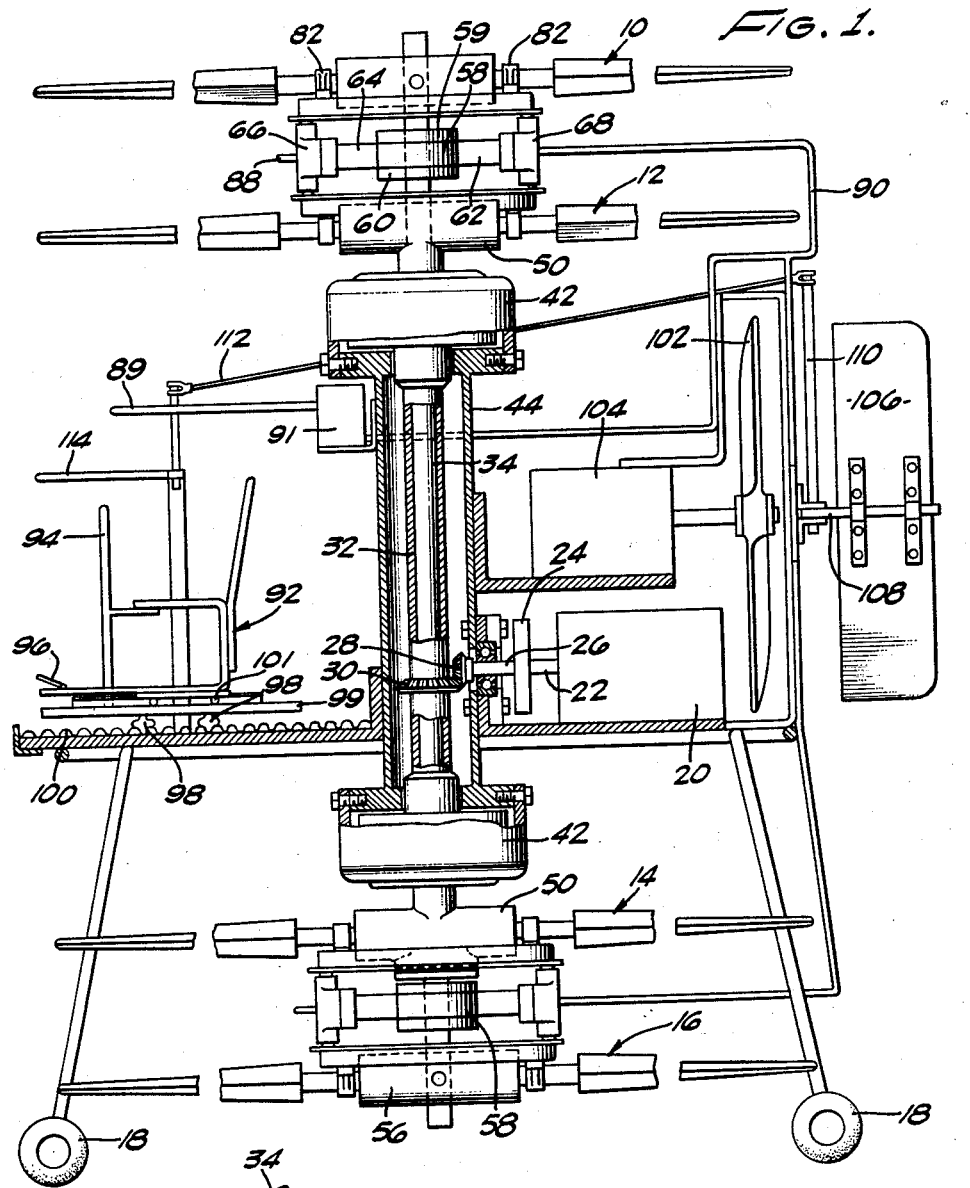
Figure 1 is a diagrammatic view of a helicopter embodying this invention with certain parts broken away.

Referring first to the embodiment illustrated in Figures 1 through 4, a diagrammatic view of the aircraft is provided with the fuselage instrument panels and other standard parts broken away. A pair of upper rotors 10 and 12 are provided at the upper extremity above the fuselage and a second pair of lower rotors 14 and 16 are provided on the underside of the fuselage. The fuselage is supported by landing gear 18 which may be of any conventional type. It is preferred that the upper and lower rotors be in counter-rotating pairs to increase the lift, eliminate torque and reduce vibration. However, single rotors or an increased number of rotors may replace the pairs illustrated.

The pairs of rotors may be made to counter-rotate by any means well known to those skilled in the art. The system illustrated comprises a suitable engine 20 mounted on the frame having a drive shaft 22 connected by clutch 24 to shaft 26 upon which bevel gear 28 is mounted. The gear 28 meshes with gear 30 mounted upon sleeve 32 driving same.

Figure 2:
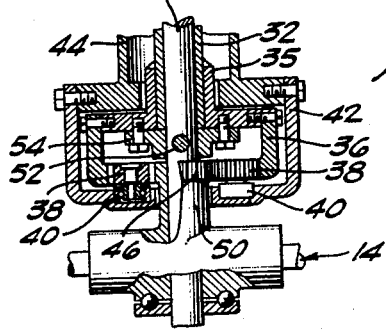
Figure 2 is an enlarged view of the lower rotor mounting.

Referring specifically to Figure 2, the sleeve surrounds a shaft 34 which extends beyond the extremities of the sleeve. At its lower end sleeve 32 has secured thereto a collar 35 upon which internal gear 36 is mounted which rotates with sleeve 32. The gear 36 meshes with spur gears 38. These gears are mounted in suitable bearings 40 which in turn are supported by yoke 42, which is mounted upon casing 44 which surrounds sleeve 32.

The spur gears 38 in turn mesh with a gear 46 mounted upon hub 50 which supports rotor 14. Thus the rotor 14 is driven in one direction.

The shaft 34 is keyed by pin 52 to collar 54 which is bolted to collar 35, so that shaft 34 is rotated in a direction opposite from the direction of hub 50 and rotor 14. The shaft 34 passes through hub 50 and has mounted at its extremity a hub 56 supporting rotor 16 which rotates with shaft 34 in a direction opposite the direction of rotation of rotor 14.

The upper rotors 10 and 12 are counter-rotated in the same manner as the lower rotors 14 and 16 by similar means, and are given the same numerical designation. Thus in vertical ascent and descent the lift is derived from rotors above and below the position of the center of gravity of the craft. The lower rotor is preferably close to the ground to increase the lift. This rotor being positioned near the ground provides an additional cushion upon landing and increases the vertical lift relative to a rotor position further from the ground. The upper and lower rotors are positioned on opposite sides of the center of gravity of the craft.

Figure 3:
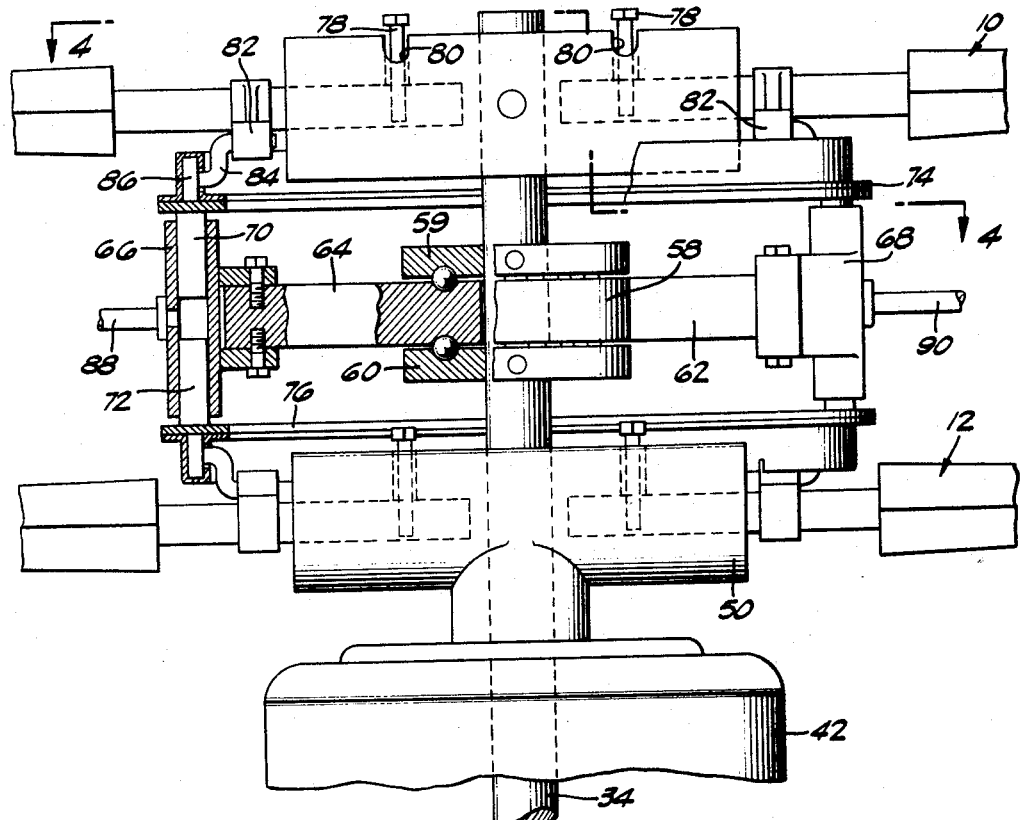
Figure 3 is a diagrammatic view of the upper rotor control system.
Figure 4:
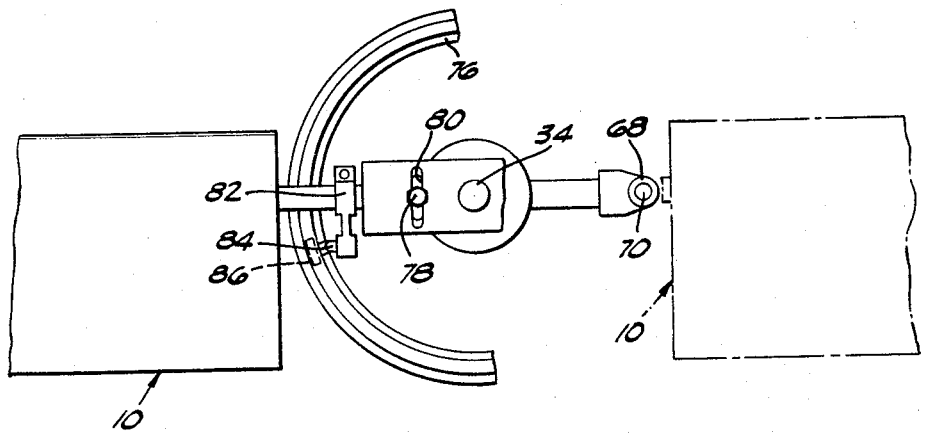
Figure 4 is a view taken along line 4—4 of Figure 3.

The vertical component of movement of the craft may be controlled by varying the pitch of the rotors, as is well known to those skilled in the art. One means of varying the rotor pitch is shown in Figures 3, 4 and 7.

A hub 58 is loosely mounted on shaft 34 by collars 59 and 60 and has oppositely disposed arms 62 and 64, each of which carries a suitable cylinder 66 and 68 at its outer extremity. Collars 59 and 60 rotate with shaft 34 while hub 58 supported between roller bearings in the collars does not rotate. The cylinders each receive opposed pistons, such as 70 and 72. The upper pistons support a race 74 while the lower pistons support a race 76.

Each rotor comprises a pair of blades rotatably secured in the appropriate hub and held by bolts such as 78, which fit in slots such as 80 in the hub. Mounted upon each of the blades is a crank-arm 82 which pivotally receives one end of crank 84, which at the other end carries a roller 86 riding in one of the races. Thus, when fluid under pressure is admitted to the cylinders 66 and 68 by lines 88 and 90, which pressure is controlled by any suitable source, the opposed pistons in either cylinder may be made to move towards or away from one another, moving the races 74 and 76, which in turn move rollers 86. The movement of the rollers through cranks 84 and crank-arms 82 rotates the rotor blades. In Figure 1 the lines 88 and 90 are joined and control lever 89 positions a suitable valve 91 to control the flow of fluid.

Thus by varying the fluid pressure in cylinders 66 and 68 the pitch of the rotors may be varied to vary the vertical lift component. Similarly, the pitch of the other pair of rotors may be simultaneously controlled. Such pitch may be changed to negative permitting free wheeling in the event of complete engine failure.

The pilot's chair 92 carries thereon a suitable control stick 94 and control levers 96 diagrammatically shown in Figure 1. The chair rests on platform 99 which in turn is supported on spaced star wheels 98 which mesh with racks such as 100 to permit movement radially of the pilot's seat to maintain balance and for directional control of the aircraft. Also the chair is supported by rollers 101 on platform 99 to permit movement thereof in any direction on the platform 99 by means of the stick 94. The stick and seat are tied together and the stick is pivoted on the platform 99.

To provide horizontal movement a propeller 102 is provided driven in this embodiment by a separate engine 104. Also a rudder 106 is controlled by linkage 108, 110, 112 by means of handle 114 adjacent the pilot's seat.

In Figures 5 and 6 a modified form of this invention is illustrated wherein like parts having like functions are given the same numerical designation as in the previously described embodiment with the addition of the exponent "a."

The upper rotors 10a and 12a are counter-rotating as in the previous embodiment. The lower rotors are replaced by propellers 116 and 118 which are driven by a suitable engine 120 which through bevel gears 122 and 124 drives sleeve 126 upon which propeller 116 is mounted and through reversing mechanism 128 drives shaft 130 in the opposite direction whereby said propellers are counter-rotating.

The counter-rotating propellers act as rotors 14 and 16 in the previous embodiment when in the solid line position as in Figure 5. The propellers 116 and 118 as well as engine 120 and the driving mechanism are pivotally mounted upon the lower end of a supporting member or sleeve 44a. A plurality of arms such as 131 are rigidly secured to casing 132 and pivoted as by shaft 134 to supporting member 44a. A counter 136 fits around supporting member 44a and engages the enlarged head 138 of arm 131 above the collar 136. A plurality of fluid actuated pistons 140 bear upon the collar. When fluid under pressure is delivered to cylinders 142, the pistons urge collar 136 downwardly, pivoting arms 131, thus moving the propellers 116 and 118 to, for example, the dotted line position where they act as propeller 102 in the previous embodiment. By varying the fluid pressure the position of the propellers forward or rearward of their central vertical position can be varied.

The pilot's seat is moved correspondingly to the shift of weight of the propellers to maintain balance.

Means are also provided for rotating the propellers 116 and 118 around the central axis of the craft to permit change of direction of the craft. In this embodiment the frame 144 carries a shaft 146 which has bevel gears 148 and 150 at each extremity thereof. The gear 148 meshes with gear 152 fixed upon casing 44a. When wheel 154 is rotated, rotating bevel gear 156 meshing with gear 150, the supporting member 44a is rotated. The arms 131 are fixed to supporting member 44a, hence the propellers 116 and 118 and engine 120 rotate with supporting member 44a to permit universal movement of the propellers.

While what hereinbefore has been described is the preferred embodiment of this invention, it is readily apparent that alterations and modifications can be resorted to without departing from the scope of this invention and such alterations and modifications are intended to be included within the scope of the appended claims.

I claim:

1. A vertically ascending and descending aircraft comprising: a fuselage, a rotor above said fuselage, a vertical drive shaft for said rotor, a propeller suspended below said fuselage a drive shaft for said propeller, supporting means carried by said fuselage, and means for pivotally mounting said propeller shaft on said supporting means for movement between a position wherein the propeller shaft axis of rotation is coaxial with the axis of rotation of said rotor shaft and a position where the axis of rotation of said propeller shaft is at an angle to said rotor shaft, said mounting means assuring a pivotal movement of the propeller in which the axis of its shaft, at all times, intersects the axis of rotation of said rotor shaft.

2. A vertically ascending and descending aircraft comprising: a fuselage, a rotor above said fuselage, a vertical drive shaft for said rotor, a propeller suspended below said fuselage, a drive shaft for said propeller, supporting means carried by said fuselage, means for pivotally mounting said propeller shaft on said supporting means for movement between a position wherein the propeller shaft axis of rotation is coaxial with the axis of rotation of said rotor shaft and a position where the axis of rotation of said propeller shaft is normal to the axis of rotation of said rotor shaft, said mounting means assuring a pivotal movement of the propeller in which the axis of its shaft, at all times, intersects the axis of rotation of said rotor shaft.

3. A vertically ascending and descending aircraft comprising: a fuselage, a rotor above said fuselage, a vertical drive shaft for said rotor, a propeller suspended below said fuselage, a drive shaft for said propeller, rotatably mounted supporting means carried by said fuselage, means for pivotally mounting said propeller shaft on said rotatably mounted supporting means, said pivotally mounting means extending transversely of the axis of rotation of said rotatably mounted supporting means, thereby forming a universal connection between said propeller shaft and said fuselage, and means for controlling the direction and amount of pivoting of said propeller shaft between a position where its axis of rotation is coaxial with the axis of rotation of said rotor shaft and a position where the axis of rotation of said propeller shaft is normal to the axis of rotation of said rotor shaft, said mounting means assuring a pivotal movement of the propeller in which the axis of its shaft, at all times, intersects the axis of rotation of said rotor shaft.

4. A vertically ascending and descending aircraft comprising: a fuselage, a rotor above said fuselage, a vertical drive shaft for said rotor, a propeller suspended below said fuselage, a drive shaft for said propeller, supporting means carried by said fuselage, means for pivotally mounting said propeller shaft on said supporting means for movement between a position wherein the propeller shaft axis of rotation is coaxial with the axis of rotation of said rotor shaft and a position where the axis of rotation of said propeller shaft is at an angle to said rotor shaft, said mounting means assuring a pivotal movement of the propeller in which the axis of its shaft, at all times, intersects the axis of rotation of said rotor shaft, a pilot seat in said fuselage and adjustable means supporting said pilot seat permitting movement thereof to counterbalance movement of said propeller.

References Cited in the file of this patent

UNITED STATES PATENTS

| | | |
|---|---|---|
| 1,042,758 | Bissell | Oct. 29, 1912 |
| 1,836,351 | Wike | Dec. 15, 1931 |
| 2,130,918 | DeStefano | Sept. 20, 1938 |

FOREIGN PATENTS

| | | |
|---|---|---|
| 411,240 | France | Apr. 7, 1910 |
| 658,376 | Germany | Mar. 31, 1938 |
| 749,113 | Germany | Nov. 15, 1944 |
| 1,097,804 | France | Feb. 23, 1955 |